US010719372B2

(12) United States Patent
Kolachala et al.

(10) Patent No.: US 10,719,372 B2
(45) Date of Patent: Jul. 21, 2020

(54) DYNAMIC PARALLELIZATION OF DATA LOADING

(71) Applicant: Oracle International Corporation, Redwood Shores, CA (US)

(72) Inventors: Subrahmanyam Kolachala, Duluth, GA (US); Jianwu Xu, Alpharetta, GA (US); Tak Hong, Marietta, GA (US); Larry E. Roddenberry, Atlanta, GA (US); Dengsheng Huang, Marietta, GA (US); Mehdi Khosravi, Duluth, GA (US); Philip Geoffrey Holland, Cambridge, MA (US); Bimal Patel, Isleworth (GB); Anoop Mohan, Cumming, GA (US); Kiran Kumar Shetty, Atlanta, GA (US); Weigang Lang, Duluth, GA (US); Eric Bloemeke, Alpharetta, GA (US); Zhibin Huang, Atlanta, GA (US); Scott D. Coulter, Marietta, GA (US)

(73) Assignee: Oracle International Corporation, Redwood Shores, CA (US)

( * ) Notice: Subject to any disclaimer, the term of this patent is extended or adjusted under 35 U.S.C. 154(b) by 366 days.

(21) Appl. No.: 15/600,989

(22) Filed: May 22, 2017

(65) Prior Publication Data

US 2018/0336073 A1    Nov. 22, 2018

(51) Int. Cl.
*G06F 9/52*     (2006.01)
*G06F 16/13*    (2019.01)
*G06F 16/18*    (2019.01)
*G06F 16/25*    (2019.01)

(52) U.S. Cl.
CPC .............. *G06F 9/526* (2013.01); *G06F 16/13* (2019.01); *G06F 16/1858* (2019.01); *G06F 16/254* (2019.01)

(58) Field of Classification Search
CPC combination set(s) only.
See application file for complete search history.

(56) References Cited

U.S. PATENT DOCUMENTS

| 5,664,172 | A  | 9/1997  | Antoshenkov      |
| 5,745,894 | A  | 4/1998  | Burrows et al.   |
| 5,884,299 | A  | 3/1999  | Ramesh et al.    |
| 6,161,103 | A  | 12/2000 | Rauer et al.     |
| 6,473,763 | B1 | 10/2002 | Corl, Jr. et al. |
| 6,732,094 | B1 | 5/2004  | Cousins et al.   |

(Continued)

*Primary Examiner* — Shyue Jiunn Hwa
(74) *Attorney, Agent, or Firm* — Potomac Law Group, PLLC (57) ABSTRACT

A system for dynamically parallelizing the loading operation for loading a data file onto a database. The dynamic parallelization of the loading operation involves scanning the data file in segments, such that scanning of an individual segment terminates when the scanned information is enough to enable loading of the segment across a plurality of exclusive-access memory blocks. Following the scanning of the first data file segment, the parallelized loading of each scanned segment occurs in a lock-step-mode with the scanning operation. As such, the loading of each scanned data segment is performed in parallel across multiple exclusive-access memory location, as determined by the prior scanning results, and furthermore in parallel with the scanning of a subsequent segment of the data file.

17 Claims, 10 Drawing Sheets

(56) References Cited

U.S. PATENT DOCUMENTS

| | | |
|---|---|---|
| 7,433,886 B2 | 10/2008 | Rathakrishnan et al. |
| 8,041,670 B2 | 10/2011 | Bakalash et al. |
| 8,321,373 B2 | 11/2012 | Bakalash et al. |
| 8,676,843 B2 | 3/2014 | Bayliss et al. |
| 9,405,808 B2 | 8/2016 | Pike et al. |
| 2002/0038229 A1 | 3/2002 | Shah et al. |
| 2002/0091707 A1 | 7/2002 | Keller |
| 2004/0111422 A1* | 6/2004 | Devarakonda .......... G06F 9/526 |
| 2004/0122844 A1 | 6/2004 | Malloy et al. |
| 2004/0230972 A1* | 11/2004 | Donovan ............ G06F 9/45533 718/1 |
| 2008/0270447 A1 | 10/2008 | Arends et al. |
| 2009/0240744 A1* | 9/2009 | Thomson ............ G06F 16/2358 |
| 2013/0018861 A1* | 1/2013 | Xu ...................... G06F 16/2308 707/704 |
| 2014/0095537 A1 | 4/2014 | Park et al. |
| 2014/0099553 A1 | 4/2014 | Park et al. |
| 2014/0250054 A1 | 9/2014 | Jones |
| 2014/0351563 A1* | 11/2014 | Vorbach ................ G06F 9/3885 712/221 |
| 2017/0177222 A1* | 6/2017 | Singh ..................... G06F 3/061 |

* cited by examiner

DYNAMIC PARALLELIZATION OF DATA LOADING

FIELD

One embodiment is directed generally to a database system, and in particular, to a data loading operation in the database system.

BACKGROUND INFORMATION

Loading a large amount of data into a database, for example, as part of retail applications, is a laborious process taking a substantial amount of time which can significantly cut into the batch window when done as part of the batch run. This is particularly significant when considering that the size of data files, depending on the application, may run into terra Bytes. Therefore any improvisation to reduce the data loading time will greatly reduce operation costs and maintenance time as well as improve the overall performance of the data loading process.

SUMMARY

One embodiment is directed to a system that parallelizes tasks involved in a loading of a data file. The system scans a data file in sequential segments, where each segment terminates when enough information is obtained to enable the scanned segment to be loaded across a plurality of exclusive-access memory blocks. The system then loads each scanned segment of the data file across a plurality of exclusive-access memory blocks in a lock-step-mode with the scanning of a next segment of the data file.

DETAILED DESCRIPTION

A stock keeping unit or "SKU" is an identifier for a distinct type of item, such as a product or service, and all attributes associated with the item type that distinguish it from other item types. For a product, these attributes could include, but are not limited to, manufacturer, description, material, size, color, packaging, and warranty terms. When a business takes an inventory, it counts the quantity it has of each SKU. In order for a business to ensure that it can meet customer demands, it needs to plan its inventory several months in advance. The required information to accomplish this may be contained in a data file of millions of Stock Keeping Units (SKUs) for multiple different stores across several days. Consequently, substantial amount of data will need to be loaded for each relevant measure.

A "measure" represents an entity that holds data for a particular type. Measures represent the events or measurements that are recorded, while the positions in the dimensions provide a context for the measurement. Measures are defined based on the business rules set in the application. The dimensionality of a measure is configured through the definition of its base intersection, which is the collection of levels (one per appropriate dimension) defining the lowest level at which the information is stored for the measure.

For example a measure may be created for "sales". The sales measure will then contain relevant data for all of the SKUs. Therefore the amount of data that the sales measure has to hold or the number of storage cells dedicated to this particular measure may be substantial. Data files containing the information for all the relevant measures are created beforehand and contain data for every cell of a measure. Any improvisation to reduce the substantial effort and time associated with the loading process involving such large data files is of great utility. The disclosed embodiments describe a novel system and method that greatly improves the performance and reduces the turnaround time of the data loading process. Embodiments of the present invention describe a unique way of scanning and loading an input data file into a database that substantially improves performance and reduces the associated time.

Efficiently loading data in binary format using source data from a flat input data file which is in text format presents a challenge. Normally the data to be loaded is read first and loaded next in a sequence, which is non-optimal. The data files are large and the input/output ("I/O") performance is dictated by the server's cache and speed. Considering the limitations imposed by the hardware, it is extremely important to optimize the loading process.

Embodiments of the disclosed invention avoid sequencing these two operations and execute the read (Scan) and write (Load) operations in parallel, while further parallelizing the write operation, thus greatly improving performance. The parallelization process is dynamic and based on segmentation of the input data file (i.e., the segment of the input data file that gets read and written to). Each segment gets split across multiple Binary Large Objects ("BLOBs"). The number of parallel tasks or steps to be executed is decided dynamically based on the segment of the input data file that has been read (scanned). The process starts with a step that reads a small portion of the input data and segregates the values by BLOBs, then, based on the BLOBs it discovered, it dynamically initializes multiple secondary steps where each step will process a subset of BLOBs, merge them with new values, and write them to persistent storage. While these secondary steps are executing, the primary step continues to read the incoming data from the input data file and segregates the values based on which BLOB they need to go to. This process is repeated until all the source data (flat input data file) gets loaded in to persistent storage in BLOB format. In addition, each step in the process is designed to be independent of the others so that they can be dispatched across multiple servers which makes the process horizontally scalable.

Figure 1:
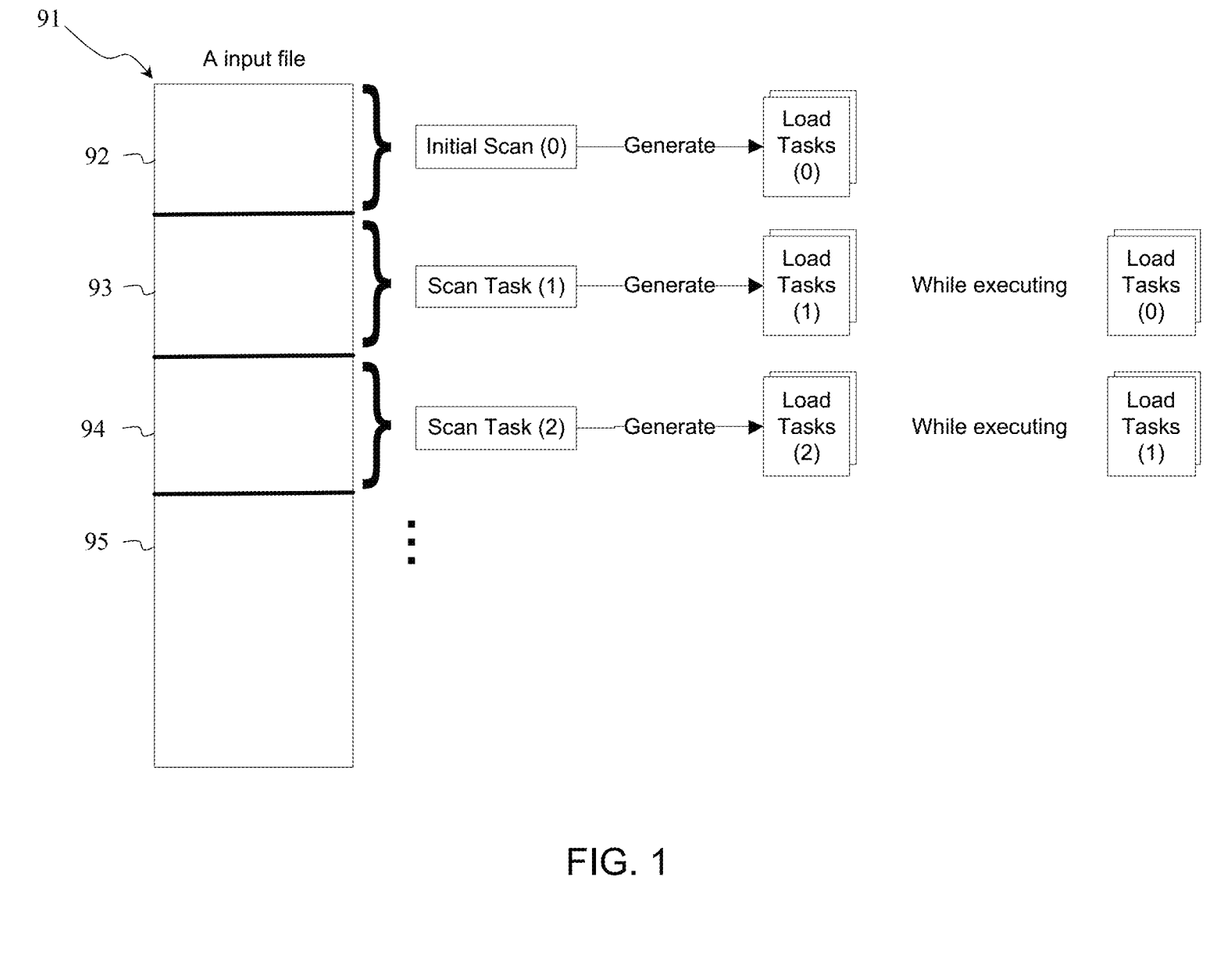
FIG. 1 is a block diagram representation of a lock-step mode parallelized scanning and loading process, in accordance to an embodiment of the present invention.

FIG. 1 is a block diagram illustrating an overview of the system operation, according to an embodiment of the invention. The loading of an input data file 91 begins right after a first segment 92 of the input data file 91 is scanned. An execution plan is then generated based on the initial scan (0) of the first segment 92 of the input data file 91. Embodiments dispatch the execution plan in order to allow the loading operation to start as soon as possible, as illustrated by load tasks (0) of the embodiment illustrated in FIG. 1. While the loading is in progress, embodiments start scanning the next segment, represented by segment 93, in order to create another plan with a new group of loading tasks, represented by load task(1). This continues until segment 94 and 95 of the input data file 91 are loaded. The described operation repeats for all the input data files, until all the input data files are loaded.

Figure 2:
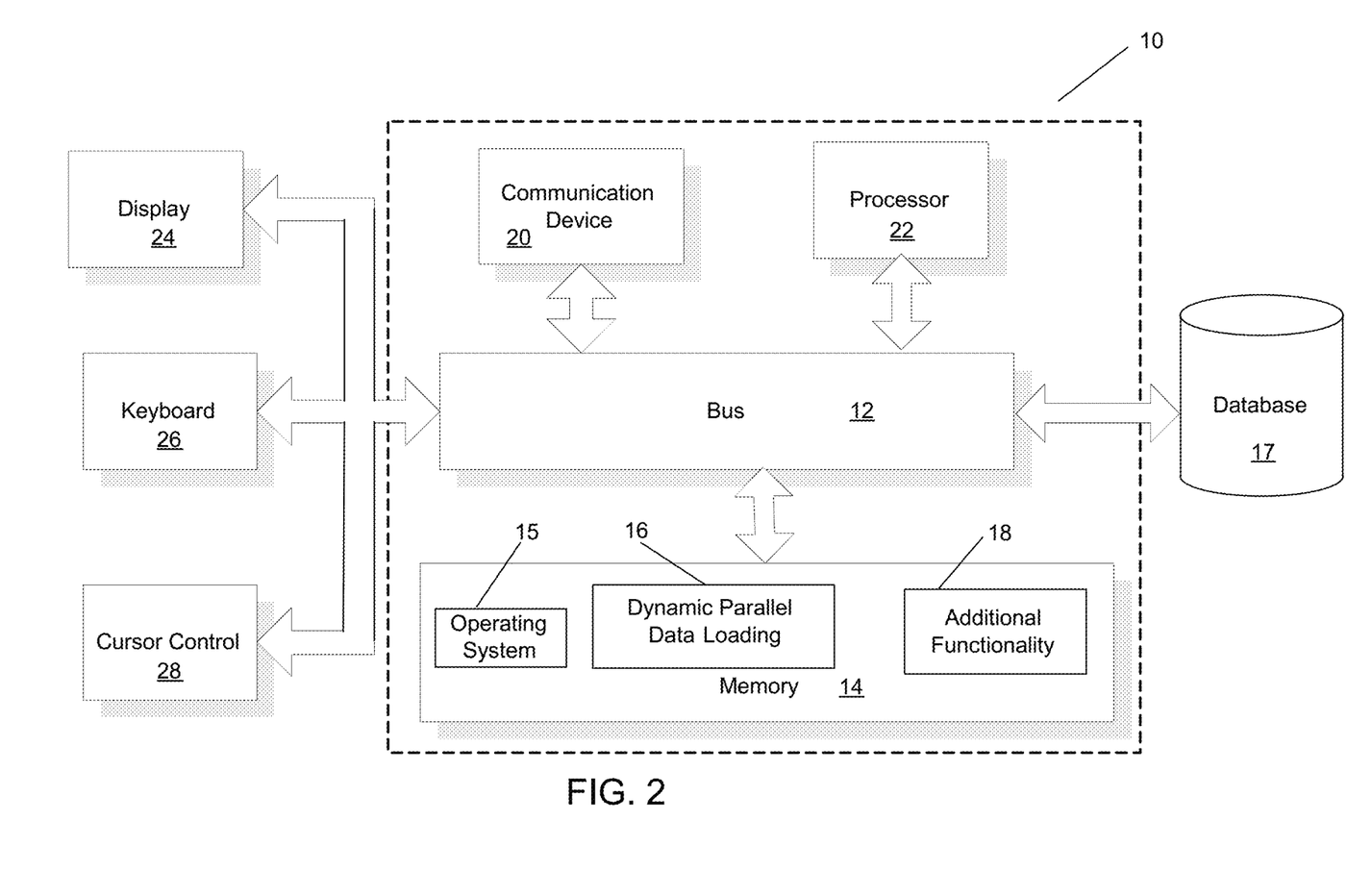
FIG. 2 is a block diagram of a computer server/system that includes a dynamic parallel data loading module for optimizing a loading process, in accordance with an embodiment of the present invention.

FIG. 2 is a block diagram of a computer server/system (i.e., system 10) in accordance with an embodiment of the present invention. Although shown as a single system, the functionality of system 10 can be implemented as a distributed system. Further, the functionality disclosed herein can be implemented on separate servers or devices that may be coupled together over a network. Further, one or more components of system 10 may not be included. For example, for the functionality of a database management system, system 10 may be a server that in general has no need for a display 24 or one or more other components shown in FIG. 2.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable medium. System 10 further includes a communication device 20, such as a network interface card, to provide access to a network. Therefore, a user may interface with system 10 directly, or remotely through a network, or any other method.

Computer readable medium may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 may further be coupled via bus 12 to a display 24, such as a Liquid Crystal Display ("LCD"). A keyboard 26 and a cursor control device 28, such as a computer mouse, may further be coupled to bus 12 to enable a user to interface with system 10 on an as needed basis.

In one embodiment, memory 14 stores software modules that provide functionality when executed by processor 22. The modules include an operating system 15 that provides operating system functionality for system 10. The modules further include a dynamic parallel data loading module 16 for processing the data for parallel loading operation, and all other functionality disclosed herein. System 10 can be part of a larger system, such as added functionality to the Oracle Database system from Oracle Corp, or any database management system. Therefore, system 10 can include one or more additional functional modules such as additional functionality module 18. A database 17 is coupled to bus 12 to provide centralized storage for dynamic parallel loading module 16 and additional functionality modules 18 (i.e., a database management module). In one embodiment, database 17 is a not only structured query language ("NoSQL") database and dynamic parallel data loading module 16 is implemented as part of a Retail Predictive Application Server ("RPAS") from Oracle Corp. These exemplary features, namely the NoSQL database and RPAS, associated with different embodiments of the invention are described in further details below.

RPAS is a configurable software platform for developing forecasting and planning applications. The RPAS platform provides capabilities such as a multidimensional database structure batch and online processing, a configurable slice-and-dice user interface, a sophisticated configurable calculation engine, user security and utility functions such as importing and exporting.

In RPAS, information is stored and represented based on the multidimensional framework. In a multidimensional database system, data is presented as a multidimensional array, where each individual data value is contained within a cell accessible by multiple indexes.

Multidimensional database systems are a complementary technology to entity relational systems and achieve performance levels above the relational database systems. Applications that run on RPAS identify data through dimensional relationships. In RPAS, dimensions are called hierarchies. Hierarchies are qualities of an item (such as a product, location, or time) or components of a dimension that define the structure and roll up within the dimension.

RPAS, in general, evaluates rule-based expressions for planning and management of analytics in a sequential process as determined by the logical inter-dependency between expressions. Evaluation of a set of expressions often involves a sequential pattern because evaluation of certain expressions may depend upon calculation outcome of expressions appearing elsewhere in the list. Therefore, calculation engines of RPAS in general identify the existing logical dependencies and accordingly sequentialize the calculation process required to carry out the evaluation of a rule set or a rule-based expression list.

A known RPAS loadmeasure utility was designed to parallelize measure data loading based on global/local domain configuration. However, in new versions of RPAS, all data are stored into a NoSQL database and the domain is no longer partitioned on a dimension. Terminal access is restricted and execution is no long triggered using a command line interface. Therefore, embodiments of the invention provide novel functionality in order to load measure data from the NoSQL database.

A NoSQL database provides a mechanism for storage and retrieval of data which is modeled in means other than the tabular relations used in relational databases. NoSQL databases are increasingly used in big data and real-time web applications. Motivations for this approach include: simplicity of design, simpler "horizontal" scaling to clusters of machines (which is a problem for relational databases), and finer control over availability. The data structures used by NoSQL databases (e.g., key-value, wide column, graph, or document) are different from those used by default in relational databases, making some operations faster in NoSQL. The particular suitability of a given NoSQL database depends on the problem it must solve. Sometimes the data structures used by NoSQL databases are also viewed as "more flexible" than relational database tables.

When compared to relational databases, NoSQL databases are more scalable and provide superior performance, and their data model addresses several issues that the relational model is not designed to address, such as: large volumes of rapidly changing structured, semi-structured, and unstructured data; agile sprints, quick schema iteration, and frequent code pushes; object-oriented programming that is easy to use and flexible; and geographically distributed scale-out architecture instead of expensive, monolithic architecture.

In general, embodiments of the present invention induce parallelization during data loading into the NoSQL database by splitting up each task into smaller tasks, and wherever possible run them in parallel and wherever not possible run them sequentially. Consequently, prior to the actual loading of the input data, a scanning task runs through the flat data file in order to determine which portions of the flat file to apply into which data block or table row of the database, and to then aggregate these loading operations into a single step such that the parallel loads will not be overstepping each other.

The input data file containing the relevant information comes in as a flat file. This flat input data file needs be loaded into persistent memory, for example noSQL database 17, which contains a plurality of storage blocks each holding an aggregate number of cells. Storage blocks of the database need to be exclusively accessed at any time. The database server contains several arrays which in essence constitute a table, where each row of the table contains an aggregate number of cells for holding a block of data. If data blocking is enabled for a measure, multiple data values are stored within a single block (table row). Updating a block by multiple processes simultaneously cannot guarantee consistent result (race condition) without row locking. Row locking however may not be desirable as it adds to the processing time and reduces the throughput. Therefore, parallel write operations are coordinated to ensure each block is exclusively accessed by a single process at a time.

Figure 3:
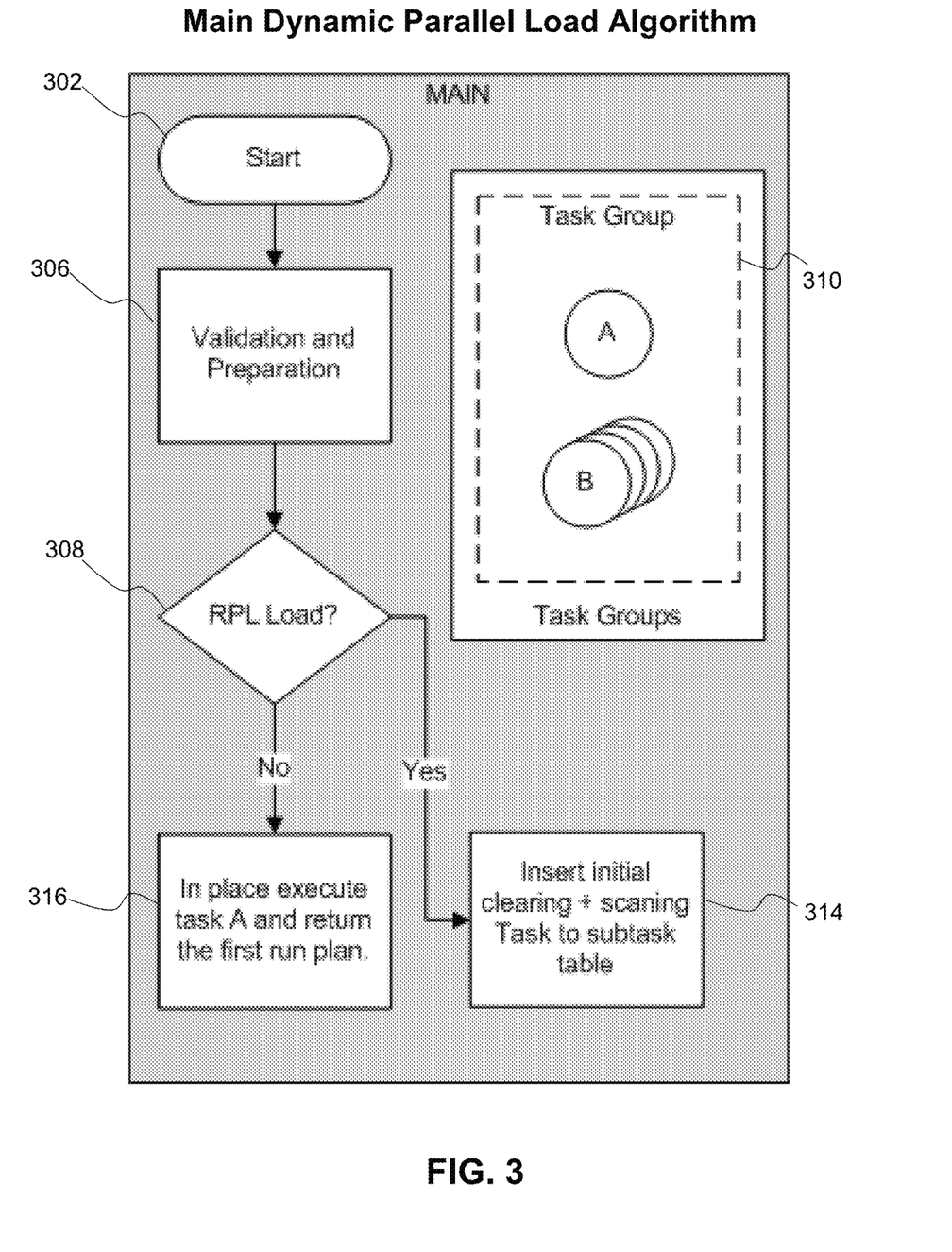
FIG. 3 is a flow diagram for a "main" process to initiate a pre-loading operation as part of the dynamic parallel data loading process, in accordance with an embodiment of the present invention.

FIG. 3 illustrates the operational flow diagram of a "main" system process, in accordance to one embodiment of the present invention. At 302, the entry point of the "main" process, embodiments check to see if an input flat data file is made available. If so, the execution moves to 306 where the input arguments are initialized and validated. At 308 the mode of loading is determined. Multiple modes of loading the data are possible. For example, Replacement Loading ("RPL") mode clears the current contents of the array cells before it starts loading the incoming data, while Overwrite Loading ("OVL") mode overwrites the content of the cells, leaving untouched other cells not written to.

A task is a simple unit of operation that can be executed individually within the execution plan. Referring to the "main" system process in FIG. 3, if a loading mode is determined to be RPL at 308, a task group 310 is generated comprising of an initial scanning task A and multiple instances of array clearing task B. Task A represents an initial scanning task performed on a first segment of the input data file and task B represents an operation to clear out the existing measure data from memory in preparation for RPL loading, so that the data scanned in during task A and subsequent scanning tasks maybe loaded into persistent memory (i.e., the database). Since each task within a task group is self-contained and will not create race conditions within the same group, initial scanning task A and multiple instances of array clearing task B are parallelizable. Furthermore, in addition to being parallelizable with the initial scanning task A, the multiple instances of array clearing task B are also parallelizable with each other. Therefore multiple measure clearing operations will be simultaneously ongoing at the same time as the scanning of an initial segment of the input data file. The expectation in performing multiple measure clearing tasks in parallel is that each measure is stored in a different row of the database table.

Therefore, as illustrated in FIG. 3, the determination of RPL loading mode at 308 moves the execution to 314 and returns an execution plan to have multiple instances of array clearing task B and initial scanning task A to execute in parallel. If the loading mode is determined not to be RPL, the execution moves to 316 where the initial scanning task A executes in place and returns the first run plan to direct the next stage of the process.

Figure 4:
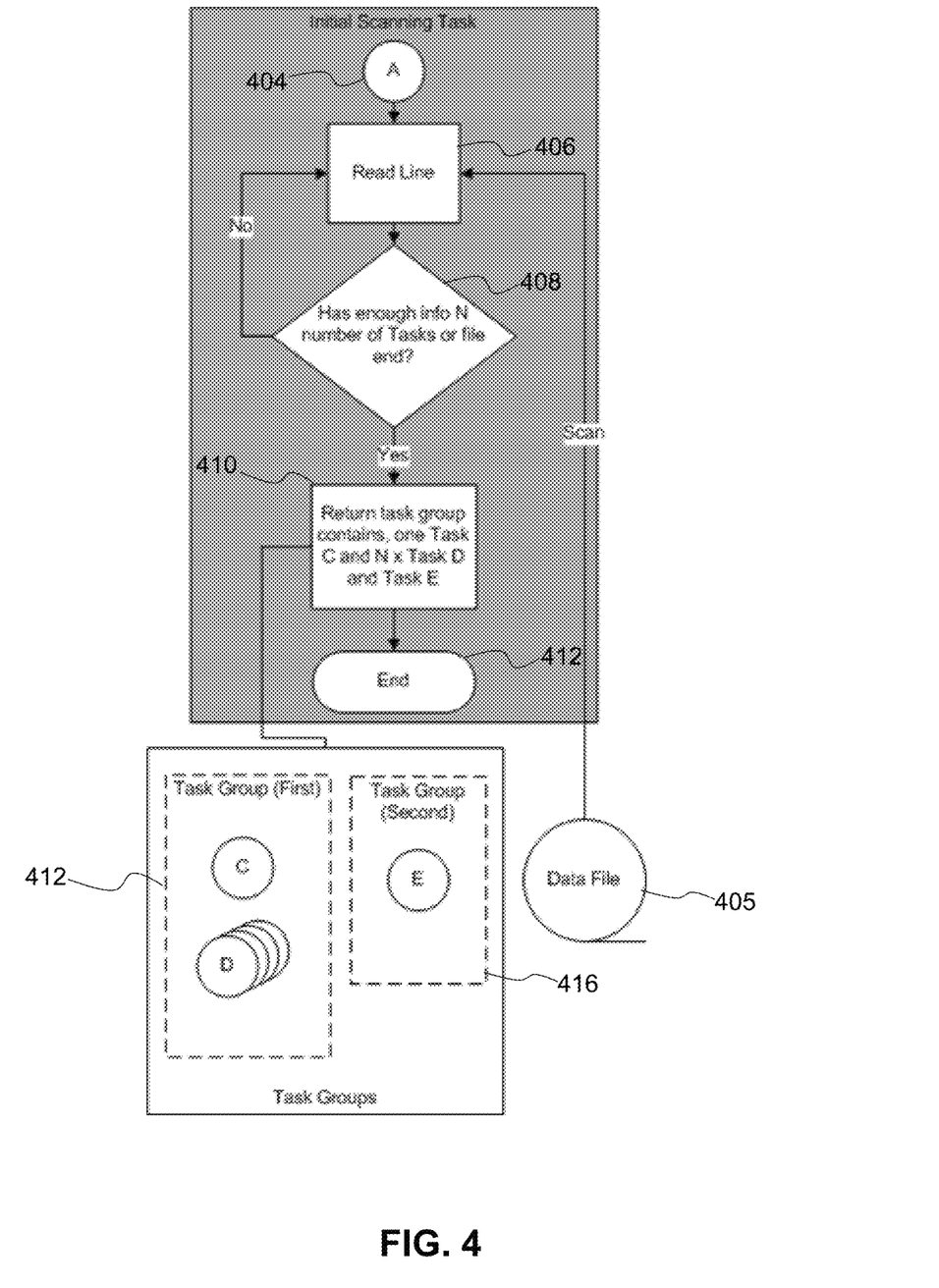
FIG. 4 is a flow diagram of an initial scanning task, in accordance to one embodiment of the present invention.

FIG. 4 illustrates an execution flow of the initial scanning task A generated by the "main" process in FIG. 3 in accordance with one embodiment. At 404 the initial scanning task A starts by scanning the input data. As each line of the input data file 405 is scanned (406), the process checks to determine whether enough task information has been scanned in to enable the generation of a set of loading tasks (408). The execution loops back to 406 to scan in the next line of data from the input data file 405 until enough information is available to generate a loading execution plan. When enough task information has been collected by the initial scanning task A, an execution plan including two task groups is returned at 410 following which the operation of the initial scanning task A ends at 412.

Figure 7:
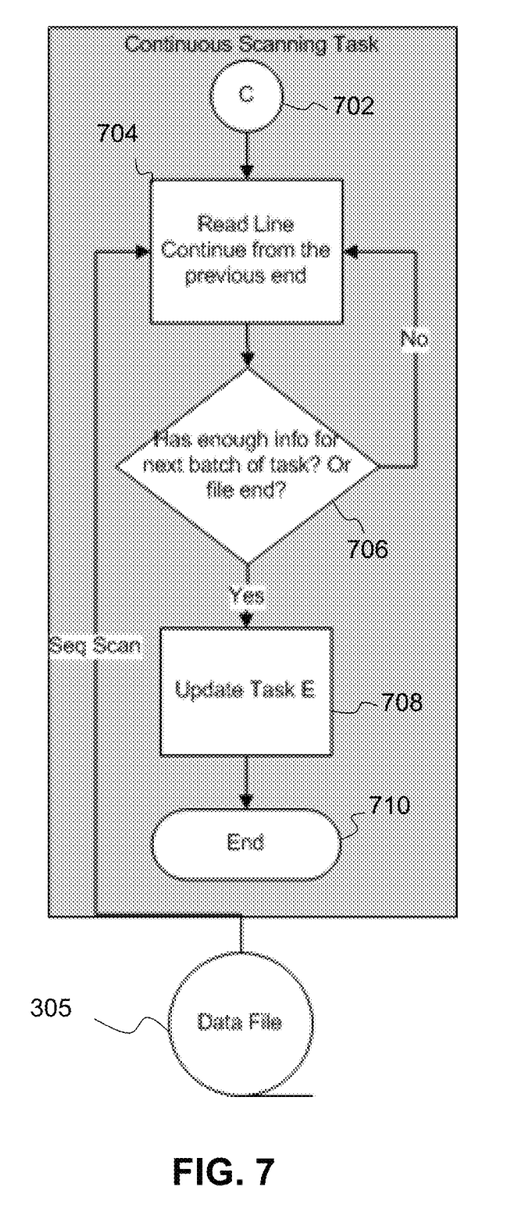
FIG. 7 is block diagram of a continuous scanning process to generate a loading execution plan, in accordance to an embodiment of the present invention.

The execution plan generated by the initial scanning task A at 410 includes a continuous scanning task C and multiple instances of a loading task D as part of a first parallelizable task group 412. In addition to being parallelizable with the continuous scanning task C, the multiple instances of the loading task D are also parallelizable with each other. Therefore, the multiple instances of loading task D are executed in parallel and at the same time as the execution of the subsequent scanning task C. The execution plan generated by the initial scanning task A at 410 further includes an iteration control/barrier task E as part of a second task group 416. Iteration control/barrier task E represents a control barrier to ensure that the data remains consistent during the entire loading process. The execution flow of task E is illustrated in FIG. 7 and described in detail below.

As stated, tasks within individual task groups are parallelizable. However, execution of different task groups occurs sequentially. Therefore, the parallel execution of task C and multiple instances of task D, within first task group 412, precede the execution of task E within second task group 416. Consequently, the initial scanning task A will generate a two-step process with the first step including the parallel execution of the tasks in the first group 412 (task C and multiple instances of task D) and the second step including the execution of second task group 416 (task E).

Figure 5:
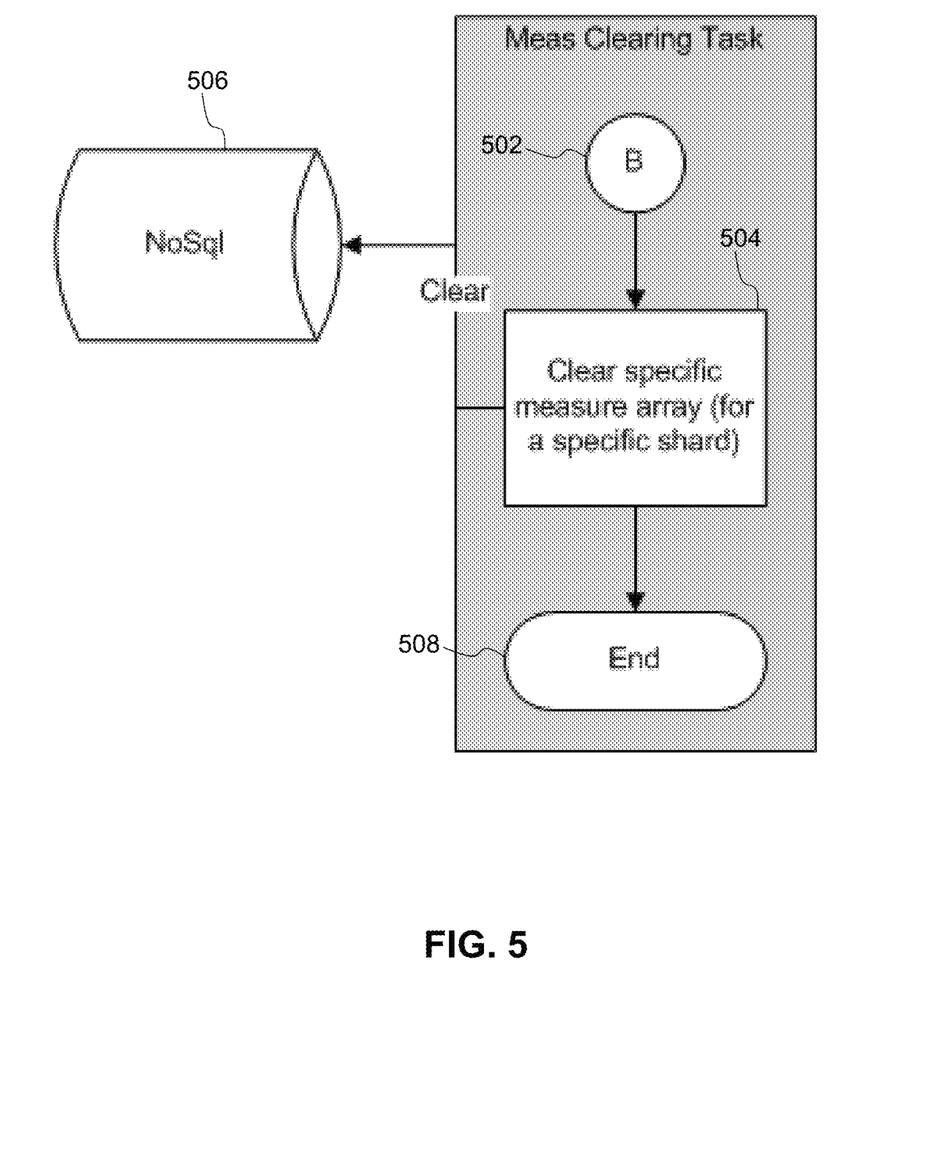
FIG. 5 is a flow diagram of an array clearing process in preparation for the loading of the data file in a database, in accordance to an embodiment of the present invention.

An operational overview of the array clearing task B from FIG. 3 which executes in parallel with the initial scanning task A is illustrated in FIG. 5. At 502 an array clear command, for example, array.clear( ) (multidelete( )), is issued to the persistent memory such as a NoSQL database 506. The execution then moves to 504 to clear data for a specific measure or multiple measures from database 506. Array clearing task B is then terminated at 508. It should be noted that multiple instances of the array clearing task B may be generated and executed in parallel to clear out existing data for multiple measures from a persistent memory such as NoSQL database 506. As described above and illustrated in FIG. 3, the multiple instances of array clearing task B are generated and executed in parallel with the initial scanning task A as part of task group 310 during the "main" system process. The expectation in this case would be that each measure is stored in a separate table row or separate block of the database 506.

Once the initial scanning task A determines which portions of the scanned data from the scanned segment of the input flat file can be loaded into individual exclusive-access blocks of memory, an embodiment immediately parallelizes the corresponding load operations while simultaneously initiating the scanning of the next segment of the input flat file starting at a point where the previous scanning operation (initial scanning task A) ended. It should be noted that the initial scanning (task A) and subsequent scanning (task C) are not full scans. Each scanning task scans the input data file only to a point where enough task information has been gathered to initiate one or more instances of the loading task D and/or other relevant tasks. The parallelized execution flow of the loading task D and the continuous scanning task C generated by the initial scanning task A (FIG. 4) are illustrated in FIGS. 6 and 7.

Figure 6:
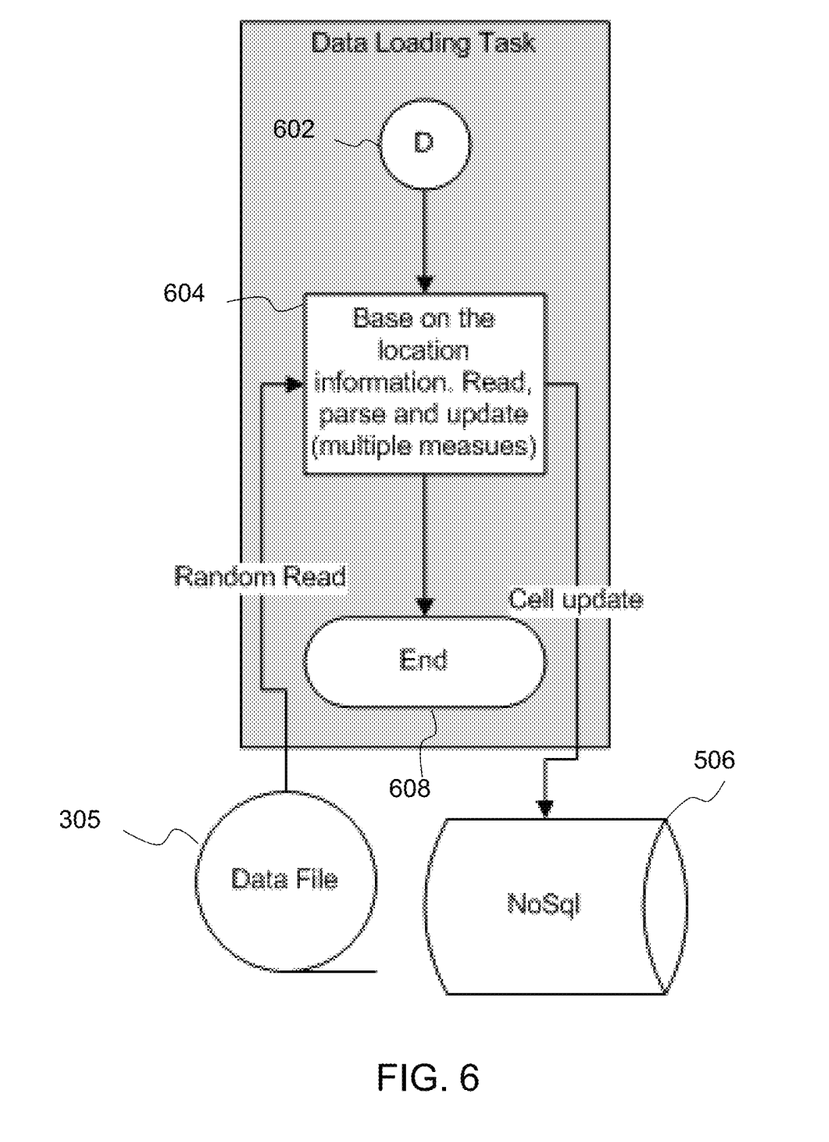
FIG. 6 is a block diagram of a process to load data into exclusive-access cells of a database as determined by a corresponding previous scanning process, in accordance to an embodiment of the present invention.

FIG. 6 illustrates an execution flow of a data loading task D in accordance with one embodiment. The loading task simply reads the location information, such as position, lines, that is generated by the previous scan task and writes the scanned segment of the data file into a database according to the specified locations. Turning to the execution flow in FIG. 6, at 602 the loading process is activated and the execution moves to 604 where a scanned data portion, corresponding to the portion of the measure data, determined by task A or C, is loaded to the corresponding storage location (determined by the bundle key), of the database 506. These locations are exclusively accessed by the process until the execution ends at 608. As stated earlier, the loading is executed in accordance with the memory location information generated during the previous scanning task. This information is embedded within the loading task D. As it was illustrated in FIG. 4, multiple parallel instances of loading task D may be generated based on a preceding scanning task. Therefore multiple memory blocks of database 506 may be written to simultaneously through parallel execution of the multiple instances of the data loading task D.

FIG. 7 illustrates an execution flow of the continuous scanning task C generated and executed in parallel with the multiple instances of the loading task D, as shown in FIG. 4, in accordance with one embodiment. Upon the activation of the process at 702 the execution moves to 704 to read in the next line of the input data file 305 picking up from where the previous scanning operation left off. The execution continues to read in data from the input data file 305 while monitoring the state of the continuous scanning operation (706) in order to stop the scanning process when enough information to generate the next batch of tasks is obtained or the end of input file is reached. When either of conditions for stopping the continuous scanning process is detected at 706, the result of the continuous scanning task C is passed onto iteration control/barrier task E at 708, the execution of which ensures that the subsequent segment of the input flat data file to be loaded into persistent memory does not collide with the previous parallelized data loading task group. Subsequently the continuous scanning task C is terminated at 710.

The result of the continuous scanning task C is similar to that of the initial scanning task A and includes the end location of the scan task and a set of loading locations for a subsequent set of data loading tasks. The result of the continuous scanning task C, however, may also contain instructions for moving to the next input data file in case the end of the current input data file is reached. A further distinction is that unlike the initial scanning task A, the result of the continuous scanning task C is not used to generate an execution plan. Instead, it is written to a subtask table and used to directly update the iteration control/barrier task E.

Any parallel loading operation has to define a barrier to prevent race conditions developing between a set of current parallelized data loading tasks and the subsequent loading of a next data file segment into persistent memory. As such, the iteration control/barrier task E represents a control barrier to ensure that the data remains consistent during the entire loading process.

In one embodiment, a scanning task monitors its peer process for completion through a status in a NoSQL table. For example, in FIG. 1, Scan Task(1) will stop its scanning operation when it detects all task in Load Tasks (0) are completed, and dispatch the Load Tasks(1) as soon as possible. Scan Task will also stop if it reaches the maximum scanning size even if not all of its peer operations are completed.

Figure 8:
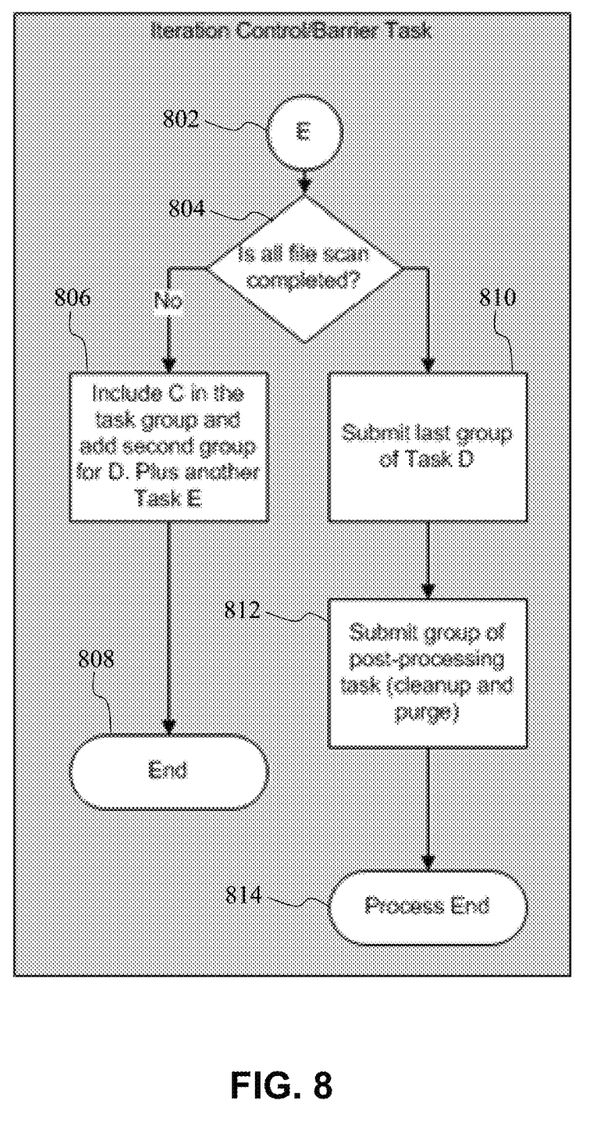
FIG. 8 is a flow diagram of an iteration control/barrier task, in accordance to an embodiment of the present invention.

FIG. 8 illustrates the execution flow of the iteration control/barrier task E in accordance with one embodiment. Subsequent to receiving the information passed onto it by continuous scanning task C, the execution of iteration control/barrier task E starts at 802. At 804 the process reads the information written to the subtask table by the continuous scanning task C in order to determine whether the scanning of the input data file has finished. If scanning of the input data file has not finished, the process moves to 806 where an execution plan similar to that generated by the initial scanning task A is generated and the execution ends at 808. The execution plan generated at 806 will continue the process of parallel scanning and loading followed by iteration control/barrier through as many iterations as required until the input data file has been entirely scanned. If the execution control at 804 indicates that the scanning of the input data file is complete, the operation moves to 810 where an execution plan including only a list of remaining data loading tasks D associated with the previous scanning task (last scanning task) is returned and the remaining loading tasks D are executed in parallel to complete the loading of the input data file into persistent memory. Subsequently, at 812, a group of post-processing tasks comprising of clean up tasks to move data files to processed directories and purge tasks to purge measure database of obsolete data are generated and the loading process is terminated at 814.

Figure 9:
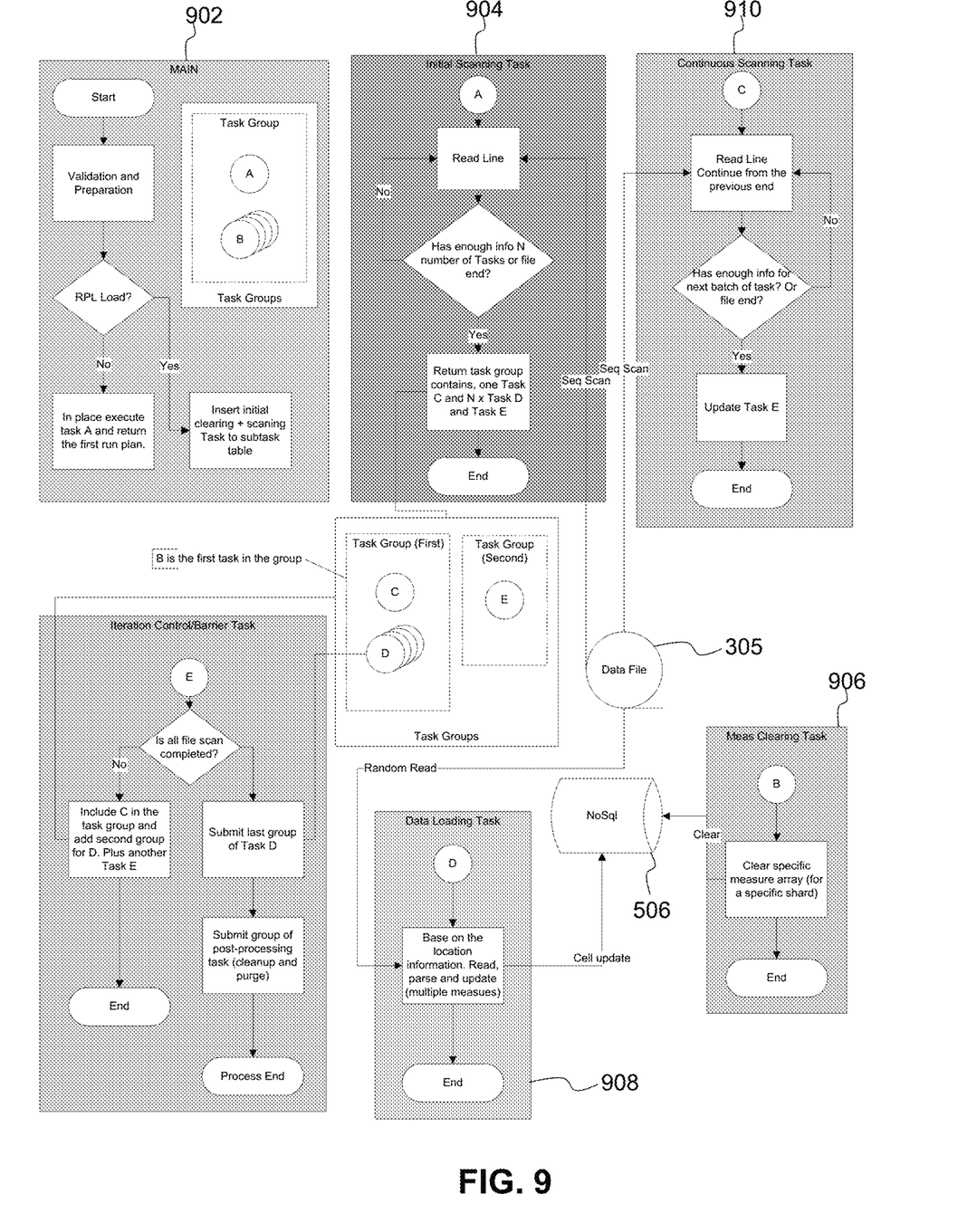
FIG. 9 is a flow diagram of a dynamic parallel data loading process, in accordance to an embodiment of the present invention.

FIG. 9 represents an operational overview of the dynamic parallel loading process, illustrating the interactions between generated process tasks and the input data file 305 and the persistent memory (i.e., NoSQL database 506) in accordance with one embodiment. As shown in FIG. 9, the "main" process 902 will generate a task group including initial scanning task 904 and multiple instances of array clearing task 906 in an event of an RPL loading mode implementation. Initial scanning task 904 performs an initial scan of a first segment of the input data file 305 and generates a set of parallelizable loading tasks 908 based on the scanned data while at the same time initiating the next scanning task 910 so that scanning of the input data file 305 is resumed from where it stopped. From there on, the scanning operation progresses through the input data file 305 segment by segment, generating a set of loading tasks for each scanned segment to be executed in parallel and at the same time as the subsequent scanning of the next data segment of the input file. The scanning and loading operations follow in a lock-step mode such that the loading task is performed as soon as operationally possible and in parallel with the scanning of a subsequent segment of the input data file. Therefore, following the initial scanning task 904, the execution of the loading tasks evolve dynamically and in a lock-step mode with the scanning tasks as the process progresses through the entire input data file 305 segment by segment until the end of the input data file is reached.

Figure 10:
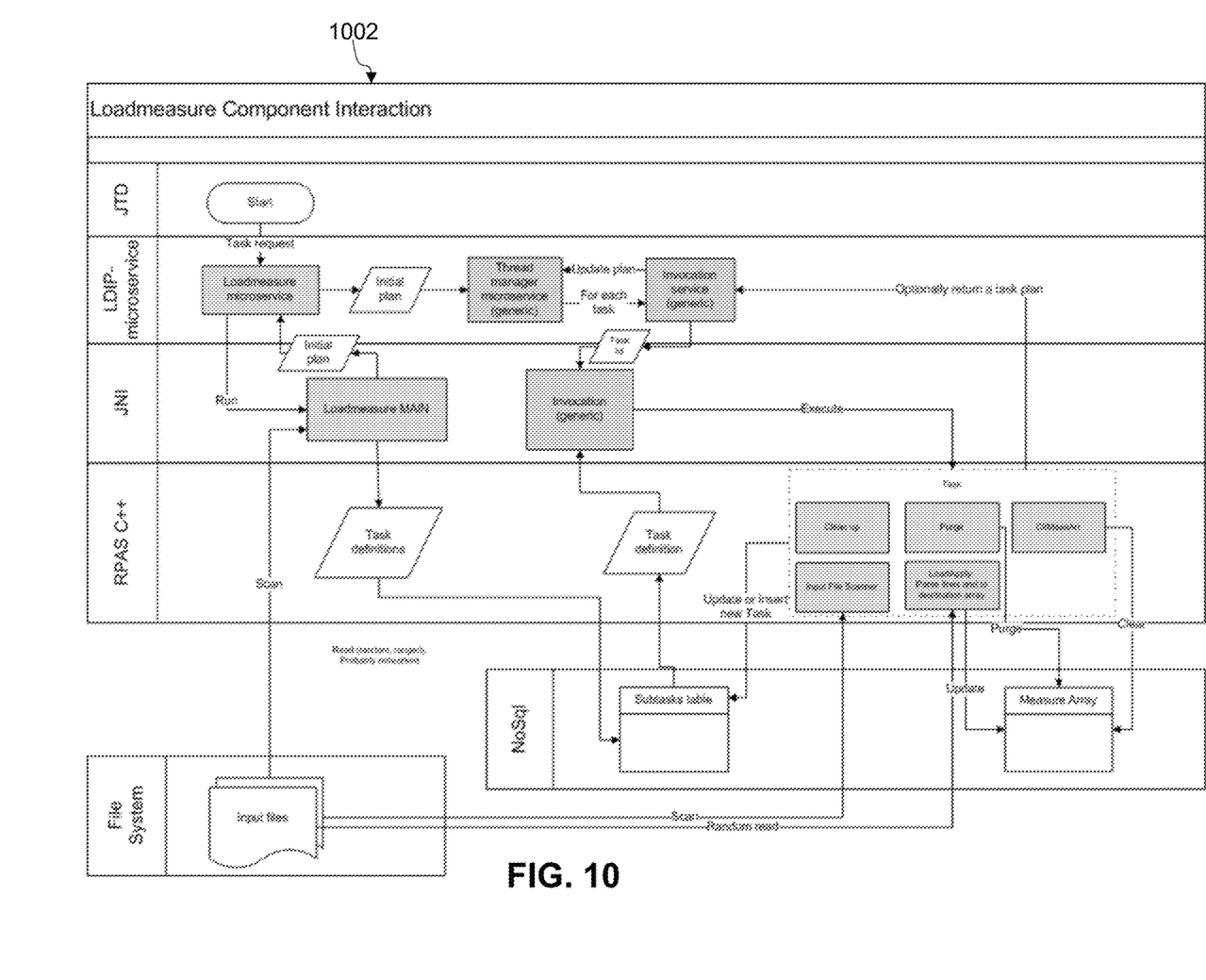
FIG. 10 is a flow diagram of a lock-step mode parallelized scanning and loading process as implemented on a RPAS platform, in accordance to an embodiment of the present invention.

FIG. 10 is a system layer diagram associated with the implementation of the dynamic parallel loading process on a RPAS platform, in accordance to one embodiment of the invention. Implementation 1002 as shown in FIG. 10 illustrates the interaction between different components of the dynamic parallel loading process, decomposition of various tasks and the layer of RPAS platform responsible for carrying out different operations. Measure loading operations are initialized by JTD (Java Daemon) which periodically pulls a queue of scheduled operations. If an operation of data load is encountered, it makes a call to an LDIP-microservice layer, which provides the entry point for the data loading operation. The service calls integrated Java Native Interface ("JNI") layer into the RPAS interface and creates an initial plan for the operation. The plan will be forwarded to another microservice for processing. The plan executor (Thread Manager Microservice) is a generic executor. It uses Java Reflection with C++ JSON Registry to dynamically create and execute a task. In FIG. 10, the various tasks of FIG. 9 (e.g., 902, 904, 910, 906, 908) are all dynamically created and executed and each can access the data and the File System.

Embodiments disclose a method and system for dynamic parallelization of tasks involved in loading of a data file, and in particular RPAS measure data stored in a NoSQL database. The data file is scanned in sequentially ordered segments. The size of each segment is determined dynamically such that each segment terminates when the amount of scanned data is sufficient to facilitate its loading across multiple exclusive-access memory blocks. The loading of each scanned segment occurs in parallel across the multiple exclusive-access memory blocks. Further, the loading of a particular scanned segment occurs simultaneously with the scanning of the subsequent segment of the data file and in this way the scanning and loading of the data file occurs in parallel and proceeds in a lock-step mode until the entire data file has been loaded onto a database.

As such, embodiments disclose a method and system for dynamically splitting the scan and load process into multiple scan and load tasks and the lock-step parallelization of the scan and load tasks in conjunction with further parallelization of the load tasks, which results in significant improvements in the data loading performance in terms of time, cost and energy.

As disclosed, embodiments allow for parallelization of reading (scanning) of an input data file and writing (loading) of the same onto a database, with further performance enhancement enabled by simultaneous parallelization of the write (load) process across multiple parallel threads.

Embodiments may be implemented on RPAS platform for loading measure data into a noSQL database. The data loading operation begins right after scanning of the first segment of input files. An execution plan is then generated based on the scanned portion in order to enable the loading operation to be split across multiple parallel loading tasks and to start as soon as possible. While the loading is in progress, the next segment of the input data file is being scanned to create another plan with the new group of loading tasks. This continues until all of the flat input data files are loaded onto a persistent storage volume.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer-readable medium having instructions stored thereon that, when executed by a processor, cause the processor to dynamically implement a parallelization of tasks involved in loading of a data file, the implementation comprising:
   scanning a data file in sequential segments, wherein the scanned data from each scanned segment is used to generate a group of loading tasks for loading of the scanned segment across a plurality of exclusive-access memory blocks;
   loading each of the scanned segments of the data file across the plurality of exclusive-access memory blocks by executing the groups of loading tasks;
   determining that a load mode for loading at least one of the segments comprises a replacement load mode;
   generating a group of clearing tasks for clearing existing data from memory, wherein the group of clearing tasks are parallelizable with the scanning of the at least one segment and one another; and
   performing the loading of the data file in a lock-step-mode with the scanning of the data file, wherein the loading of a given scanned segment of the data file by executing the corresponding group of loading tasks occurs in parallel with the scanning of a segment subsequent to the given segment of the data file and the loading of the one segment loads data into a least a portion of memory that is cleared by the group of clearing tasks.

2. The non-transitory computer readable medium of claim 1, wherein each loading across the plurality of exclusive-access memory blocks occurs in parallel.

3. The non-transitory computer readable medium of claim 1, wherein the data corresponds to measure data that represents an entity that holds data for a particular type.

4. The non-transitory computer readable medium of claim 3, wherein the data file is loaded onto a noSQL database and data for each measure is stored in a different row in the noSQL database.

5. The non-transitory computer readable medium of claim 1, wherein the parallelization occurs within a Retail Predictive Application Server (RPAS) platform.

6. A computer-implemented method for dynamically parallelizing tasks involved in a loading of a data file, the method comprising:
   scanning the data file in sequential segments, wherein the scanned data from each scanned segment is used to generate a group of loading tasks for loading of the scanned segment across a plurality of exclusive-access memory blocks;
   loading each of the scanned segments of the data file across plurality of exclusive-access memory blocks by executing the groups of loading tasks;

determining that a load mode for loading at least one of the segments comprises a replacement load mode;

generating a group of clearing tasks for clearing existing data from memory, wherein the group of clearing tasks are parallelizable with the scanning of the at least one segment and one another; and performing the loading of the data file to proceed in a lock-step-mode with the scanning of the data file, wherein the loading of a given scanned segment of the data file by executing the corresponding group of loading tasks occurs in parallel with the scanning of a segment subsequent to the given segment of the data file and the loading of the one segment loads data into a least a portion of memory that is cleared by the group of clearing tasks.

7. The computer-implemented method of claim 6, wherein each loading across the plurality of exclusive-access memory blocks occurs in parallel.

8. The computer-implemented method of claim 6, further comprising a control task for preventing race conditions associated with the loading of the data file.

9. The computer-implemented method of claim 6, wherein the data corresponds to measure data that represents an entity that holds data for a particular type.

10. The computer-implemented method of claim 9, wherein the data file is loaded onto a noSQL database and data for each measure is stored in a different row in the noSQL database.

11. The computer-implemented method of claim 6, wherein the parallelization occurs within a Retail Predictive Application Server (RPAS) platform.

12. A system for parallelizing a loading of a data file, comprising:

a processor coupled to memory that is configured to:

scan a data file in sequential segments, wherein the scanned data from each scanned segment is used to generate a group of loading tasks for loading of the scanned segment across a plurality of exclusive-access memory blocks;

load each of the scanned segments of the data file across the plurality of exclusive-access memory blocks; determining that a load mode for loading at least one of the segments comprises a replacement load mode;

generating a group of clearing tasks for clearing existing data from memory, wherein the group of clearing tasks are parallelizable with the scanning of the at least one segment and one another; and perform the loading of the data file in a lock-step-mode with the scanning of the data file, wherein the loading of a given scanned segment of the data file by executing the corresponding group of loading tasks occurs in parallel with the scanning of a segment subsequent to the given segment of the data file and the loading of the one segment loads data into a least a portion of memory that is cleared by the group of clearing tasks.

13. The system of claim 12, wherein each loading across the plurality of exclusive-access memory blocks occurs in parallel.

14. The system of claim 12, wherein the second unit further ensures data consistency by preventing race conditions associated with the loading of the data file.

15. The system of claim 12, wherein the data corresponds to measure data that represents an entity that holds data for a particular type.

16. The system of claim 15, wherein the data file is loaded onto a noSQL database and data for each measure is stored in a different row in the noSQL database.

17. The system of claim 12, wherein the parallelization occurs within a Retail Predictive Application Server (RPAS) platform.

* * * * *

UNITED STATES PATENT AND TRADEMARK OFFICE
CERTIFICATE OF CORRECTION

PATENT NO. : 10,719,372 B2
APPLICATION NO. : 15/600989
DATED : July 21, 2020
INVENTOR(S) : Kolachala et al.

It is certified that error appears in the above-identified patent and that said Letters Patent is hereby corrected as shown below:

In the Drawings

On sheet 6 of 10, in FIG. 6, under Reference Numeral 604, Line 5, delete "measues)" and insert -- measures) --, therefor.

In the Specification

Column 4, Line 54, delete "loadmeasure" and insert -- load measure --, therefor.

In the Claims

Column 10, Line 44, Claim 2, delete "computer readable" and insert -- computer-readable --, therefor.

Column 10, Line 47, Claim 3, delete "computer readable" and insert -- computer-readable --, therefor.

Column 10, Line 50, Claim 4, delete "computer readable" and insert -- computer-readable --, therefor.

Column 10, Line 54, Claim 5, delete "computer readable" and insert -- computer-readable --, therefor.

Signed and Sealed this
Fourth Day of May, 2021

Drew Hirshfeld
*Performing the Functions and Duties of the*
*Under Secretary of Commerce for Intellectual Property and*
*Director of the United States Patent and Trademark Office*